US008082220B2

(12) United States Patent
Hadad et al.

(10) Patent No.: US 8,082,220 B2
(45) Date of Patent: Dec. 20, 2011

(54) COMPUTING SOLUTIONS TO PROBLEMS USING DYNAMIC ASSOCIATION BETWEEN ABSTRACT GRAPHS

(75) Inventors: Meirav Hadad, Bnei Brak (IL); Dekel Tzidon, Hod Hasharon (IL); Natalie Fridman, Petach Tikva (IL)

(73) Assignee: Elbit Systems Ltd., Rehovot (IL)

( * ) Notice: Subject to any disclaimer, the term of this patent is extended or adjusted under 35 U.S.C. 154(b) by 819 days.

(21) Appl. No.: 12/177,329

(22) Filed: Jul. 22, 2008

(65) Prior Publication Data

US 2009/0265299 A1   Oct. 22, 2009

Related U.S. Application Data

(60) Provisional application No. 61/045,664, filed on Apr. 17, 2008, provisional application No. 61/045,665, filed on Apr. 17, 2008.

(51) Int. Cl.
*G06F 15/00* (2006.01)
*G06F 15/18* (2006.01)

(52) U.S. Cl. ............... 706/62; 706/45; 706/46

(58) Field of Classification Search ............ None
See application file for complete search history.

(56) References Cited

U.S. PATENT DOCUMENTS

| | | | |
|---|---|---|---|
| 6,574,788 B1 * | 6/2003 | Levine et al. | 716/102 |
| 6,883,148 B1 | 4/2005 | Teig et al. | |
| 7,480,893 B2 * | 1/2009 | Berenbach et al. | 717/104 |
| 7,797,177 B2 * | 9/2010 | Chung et al. | 705/7.11 |
| 7,860,814 B1 * | 12/2010 | Plotnick | 706/13 |
| 7,954,083 B2 * | 5/2011 | Berenbach et al. | 717/105 |
| 7,984,012 B2 * | 7/2011 | Coury et al. | 706/62 |
| 7,987,110 B2 * | 7/2011 | Cases et al. | 705/7.13 |
| 2005/0005272 A1 * | 1/2005 | Moody et al. | 718/104 |
| 2007/0094174 A1 | 4/2007 | Hamadi et al. | |
| 2007/0094184 A1 | 4/2007 | Emek et al. | |
| 2008/0065573 A1 | 3/2008 | Macready | |

OTHER PUBLICATIONS

Stanton, "Hierarchical Task Analysis: Developments, Applications, and Extensions", Applied Ergonomics 37, 2006, pp. 55-79.*
Lotem et al. "Using planning graphs for solving HTN planning problems", AAAI-99 Proceedings, 1999, 7 pages.*
Paolucci, M. et al., Interleaving Planning and Execution in a Multiagent Team Planning Environment, Electron. Transf. Artif. Intell., Feb. 2000, p. 33-43, 4, The Robotics Institute, Carnegie Mellon University, and IBM Research Lab in Haifa, the Tel Aviv Site.

(Continued)

*Primary Examiner* — Omar Fernandez Rivas
(74) *Attorney, Agent, or Firm* — Brown Rudnick LLP

(57) ABSTRACT

A device, system, and method for solving a plurality of sub-problems representing a main problem pertaining to an environment. An abstract graph corresponding to each of the sub-problems may be constructed in a computing system for each of the sub-problems. At least a first abstract graph of the abstract graphs may be resolved, for example, by decomposing one or more nodes of the first abstract graph. At least one of the one or more nodes of the first abstract graph may be associated with one or more nodes of others of the abstract graphs. At least one of the abstract graphs may be resolved using information obtained by the association. Other embodiments are described and claimed.

23 Claims, 8 Drawing Sheets

OTHER PUBLICATIONS

Tambe Milind, Towards Flexible Teamwork, Journal of Artificial Intelligence 7, Sep. 1997, p. 83-124, Information Sciences Institute and Computer Science Department, University of Southern California, USA.

Grosz, Barbara J., et al., Collaborative Plans for Complex Group Action, Artificial Intelligence, 1996, p. 269-357, 86 (2).

Kutluhan Erol, et al., HTN Planning: Complexity and Expressivity, 1994, AAAI-94, p. 1123-1128, Computer Science Department, University of Maryland, US.

Kaminka A. Gal, et al., Integration of Coordination Mechanisms in the BITE Multi-Robot Architecture, ICRA-07, 2007, p. 2859-2866, Computer Science Department, Bar Ilan University, Israel.

Holte C. Robert, et al., Abstraction and reformulation in artificial intelligence, The Royal Society, Jun. 2003, p. 1197-1204, Department of Computing Science, University of Alberta, Canada.

Illah R. Nourbakhsh, Using Abstraction to Interleave Planning and Execution, Robotics Institute, 1998, Carnegie Mellon University, Pennsylvania, USA.

NP-Hard, from Wikipedia, http://en.wikipedia.org/wiki/NP-hard; saved Apr. 3, 2008.

Tanner Brian, et al., Grounding Abstractions in Predictive State Representations, IJCAI-07, p. 1077-1082, 2007, Department of Computing Science, Alberta, Canada.

International Search Report for International Application PCT/IL09/00389 dated Aug. 5, 2009.

* cited by examiner

COMPUTING SOLUTIONS TO PROBLEMS USING DYNAMIC ASSOCIATION BETWEEN ABSTRACT GRAPHS

RELATED APPLICATION DATA

This application claims the benefit of prior U.S. provisional application No. 61/045,664, filed on Apr. 17, 2008, entitled "AUTONOMOUS MULTIPLE INTELLIGENT-AGENTS WITH GOAL ORIENTATION" and prior U.S. provisional application No. 61/045,665, filed on Apr. 17, 2008, entitled "METHOD OF DYNAMIC ASSOCIATION BETWEEN ABSTRACT GRAPHS", both of which are incorporated herein by reference in their entirety.

FIELD OF THE INVENTION

The present invention relates to problems to be resolved in large search space or in uncertain and dynamic real-world conditions. More particularly the present invention relates to a method for solving a complicated problem using dynamic association between abstract graphs that represent a set of sub-problems of the complicated problem.

BACKGROUND OF THE INVENTION

Recently, several research groups as well as commercial enterprises have been striving to develop a general artificial intelligence (AI) engine for real-world applications that copes with problems and uncertain in complex and dynamic environments. In these environments it is impractical and usually unfeasible to envisage and pre-program in advance all the possible situations and events that may occur. Accordingly, development of an AI engine should be aimed to include capabilities that enable it to reason about unanticipated opportunities. Moreover, typically the AI engine should be independent of domain knowledge to allow reusability across several domains. These essential properties enable more realistic behavior of the application, and provide added flexibility to the system saving implementation efforts.

To solve a problem (e.g., to identify the best action for each situation), a solution set or search space including permutations of possible outcomes must be known. A problem in dynamic and uncertain environment is difficult to be solved since the search space becomes large, even for relatively small problems. A well known technique to resolve problems with a large search space is an abstraction based technique. In that technique the original search space is mapped into abstract space in which irrelevant details are disregarded at different levels of granularity. The abstraction based technique has been proven to be effective in several search problems. For example, abstraction is found to improve the efficiently of real-time path-finding problem (V. Bulitko, N. Sturtevant, J. Lu, and T. Yau, 'Graph Abstraction in Real-time Heuristic Search', Journal of Artificial Intelligence Research, 30, pp. 51-100, (2007)). In addition, abstraction is often used in real world applications for task planning, in which planning and execution are interleaved (M. Paolucci, O. Shehory, and K. Sycara, 'Interleaving planning and execution in a multiagent team planning environment', Electron. Trans. Artif. Intell., 4, pp. 33-43, (2000)).

Abstraction based techniques include representing problems with abstract graphs. An abstract graph may be initially used to represent a partial solution to a problem and may be extended as the solution is refined and completed, for example, as details are added. Partial solutions to a problem may include a subset of the complete solution set or search space, in which some, but not all, permutations of possible outcomes are known. With abstraction based technique, partial solutions may be applied to the problem to modify the environment. Partial solutions can be applied to the problem at a variety of different levels. The abstract graph of the partial solution can be expanded using the partial knowledge along with dynamic changes to the environment that occur during the process of solving the problem. Thus, the abstraction based technique may be suitable to handle real-world problems that involve partial knowledge of the problem and its environment.

An abstract graph typically includes nodes (e.g., vertices) and edges arranged in multiple levels. A complete solution to a problem may include a complete solution set or search space, in which all permutations of possible outcomes are known. The complete solution is typically represented by a graph having all levels fully instantiated. Therefore, a complete graph can be viewed as fully instantiated sets of nodes and edges, which are required for resolving the entire problem. In the same way, an abstract graph of the partial solution can be viewed as partially instantiated sets of nodes and edges, which are modified in the process of solving the problem as the partial solution is refined.

The refinement process extends the abstract graph of the partial solution to become a complete graph of the complete solution. The refinement process includes several operations which depend on the type of the problem. For example, in a task planning problem, a sequence of executable tasks may be determined to achieve a given goal. Resolving this problem by abstraction based technique often involves engaging a hierarchical planning strategy that exploits well-designed hierarchies of a task, which is referred to as a Hierarchical Task Network (HTN) planner (K. Erol, D. Nau, and J. Hendler, '{HTN} planning: Complexity and expressivity', in AAAI-94, pp. 1123-1128, (1994)). In the hierarchical planning strategy, an initial task, which describes an abstract plan, is an over-arching (e.g., high-level) description of the problem. The abstract plan is then refined by applying a deconstruction operation to deconstruct the initial task into a partially ordered set of lower-level sub-tasks. The abstract plan may be represented by an abstract graph in which the tasks are represented by nodes and the dependencies among the tasks are represented by edges. The deconstruction operation extends the abstract graph by inserting nodes and edges into the graph. The deconstruction operation may be considered complete when all the tasks of the abstract graph are deconstructed into smaller sub-tasks until the lowest level tasks are atomic executable tasks. An atomic executable task is a task that cannot or need not be deconstructed into multiple sub-tasks.

The structure of an abstract graph is consistent with the type of the problem. The structure of an abstract graph may include, e.g., the type of connection between the nodes (by the edges), the process by which new edges and nodes are added to the abstract graph, the type of data assigned to each node and edge, and/or other features of the abstract graph. For example, the graphs of FIGS. 1 and 2 (e.g., having a hierarchical task network structure) have a different structure than the graphs of FIG. 6 (e.g., having a temporal constraint network and a navigation graph using a clique or quad-three representation). Thus, dissimilar problems may be represented by different structures of abstract graphs. In one example, an abstract graph representing a path-finding problem (e.g., in which a planner searches a route from a source to a destination on a map) typically has a different structure than an abstract graph representing a task planning problem. Other examples of abstract graphs having dissimilar structures include, for example: a constraint-satisfaction graph for finding a solution that satisfies given constraints (e.g., a scheduler with temporal constraints); a hierarchical tree graph that represents an organization (e.g., military force); and a graph that represents a plan of an area (e.g., city plan, architecture plan). Furthermore, even similar problems may be resolved in different ways and thus are represented with different abstract graphs. For example, a path-finding problem may be resolved either by quad-trees (H. Samet, An overview of quadtrees, octrees, and related hierarchical data structures, in: NATO ASI Series, Vol. F40 (1988), 51-68) or by a clique (from abstraction technique, as described by V. Bulitko, N. Sturtevant, J. Lu, and T. Yau, referenced hereinabove). Accordingly, the construction of an abstract graph is based on the type of resolving technique and on the specific type and environment of the problem.

SUMMARY OF THE INVENTION

In an embodiment of the invention, a data structure in a computing system may store a plurality of sub-problems representing a main problem pertaining to an environment. An abstract graph corresponding to each of the sub-problems may be constructed in the computing system for each of the sub-problems. At least a first abstract graph of the abstract graphs may be resolved, for example, by decomposing one or more nodes of the first abstract graph. At least one of the one or more nodes of the first abstract graph may be associated with one or more nodes of others of the abstract graphs. At least one of the abstract graphs may be resolved using information obtained by the association. Other embodiments are described and claimed.

In an embodiment of the invention, an abstract graph may be constructed in the computing system for each of a plurality of independent sub-problems. The plurality of independent sub-problems represent a main problem. Each abstract graph may include an ordered set of nodes. A first node of a first abstract graph of the abstract graphs may be associated with a second node of a second abstract graph of the abstract graphs. At the first node, it may be determined if available data can be used to solve the first abstract graph to resolve the sub-problem corresponding thereto. If the available data cannot be used to resolve the sub-problem corresponding to the first abstract graph, a process may switch to a second node for resolving the sub-problem corresponding to the second abstract graph.

In an embodiment of the invention, a method for solving a main problem includes constructing a plurality of abstract graphs each including nodes. Each abstract graph may represent one of a plurality of sub-problems. The plurality of sub-problems taken together typically represent the main problem pertaining to an environment. At least one node of an abstract graph may be decomposed into at least two nodes. A subset of the nodes may be associated. The association may include: (i) selecting a first node of a first one of the abstract graphs representing a first one of the sub-problems; (ii) selecting one or more second nodes of other abstract graphs representing a second one of the sub-problems; and (iii) creating an association between the first and second nodes in which information pertaining to the first node of the first abstract graph is associated to the one or more nodes of the other abstract graphs. One or more of the other abstract graphs may be further decomposed, for example, using the associated information and resolving least one of the other abstract graphs. The steps of associating nodes for different nodes and further decomposing may be iterated to obtain a solution for the main problem.

BRIEF DESCRIPTION OF THE DRAWINGS

In order to better understand the present invention, and appreciate its practical applications, the following Figures are provided and referenced hereafter. It should be noted that the Figures are given as examples only and in no way limit the scope of the invention. Like components are denoted by like reference numerals.

DETAILED DESCRIPTION OF PREFERRED EMBODIMENTS

Figure 1:
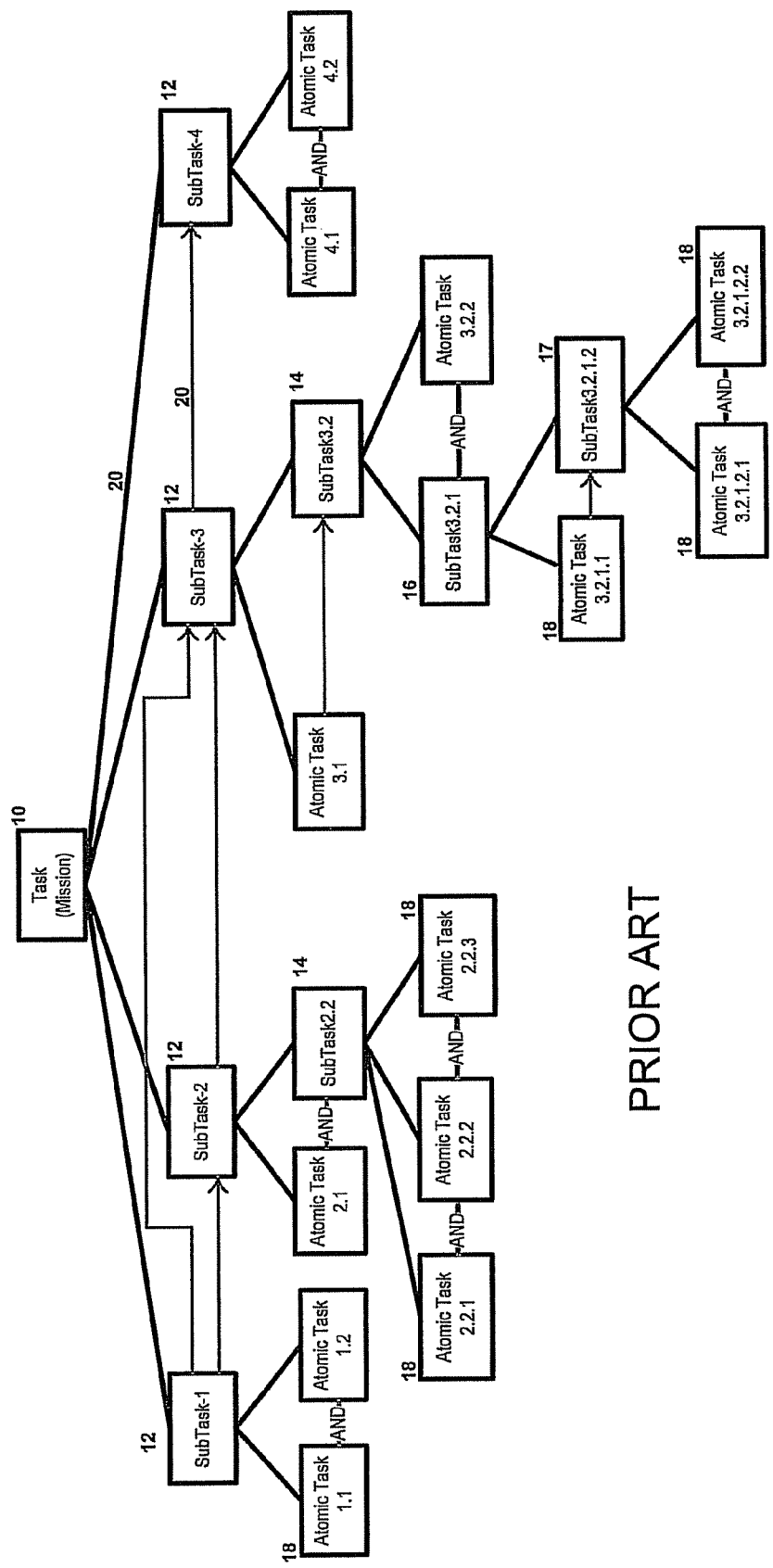
FIG. 1 is a complete graph representation of a task to solve a complex problem in which hierarchical planning strategy is used to plan the task (PRIOR ART).

In the following detailed description, numerous specific details are set forth in order to provide a thorough understanding of the invention. However it will be understood by those of ordinary skill in the art that the present invention may be practiced without these specific details. In other instances, well-known methods, procedures, components and circuits have not been described in detail so as not to obscure the present invention.

Unless specifically stated otherwise, as apparent from the following discussions, it is appreciated that throughout the specification discussions utilizing terms such as "processing", "computing", "calculating", "determining", "dividing", "solving", or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices. In addition, the term "plurality" may be used throughout the specification to describe two or more entities, such as components, devices, elements, parameters and the like.

According to embodiments of the present invention a novel technique is provided for solving a complicated problem having a large search space or uncertain and dynamic real-world conditions. A complicated problem is a problem that may be deconstructed into a plurality of sub-problems, where each sub-problem is not necessarily of the same type. The type of a problem may refer to a problem solver (e.g., an algorithm or mechanism) for resolving the problem and the abstract graph representation corresponding to the problem. A problem solver is well known in the field of AI and may be enabled by a user and/or a computing system. Each sub-problem may be resolved in a different way and may represent a dissimilar type of complex problem. A complex problem is a problem that may be further deconstructed into a plurality of sub-problems, where each sub-problem is either of the same type (e.g., represented by an abstract graph having the same structure) or is an atomic executable task. All the sub-problems of each complex problem are typically represented on a single abstract graph. In contrast, a complicated problem, deconstructed into a plurality of types of sub-problems, is typically represented by a plurality of graphs, each graph representing one of the plurality of sub-problems of a particular type.

Conventional abstraction based techniques, typically solve a specific type of problem using the corresponding mechanism or problem solver and the corresponding abstract graph representation. The problem may include a plurality of sub-problems. If the problem is a complex problem, the plurality of sub-problems are of the same type, and the same mechanism or problem solver is used to refine the problem. If the problem is a complicated problem and includes a plurality of different types of sub-problems, one of these sub-problems is typically defined as the main complex problem. The main complex problem is represented by an abstract graph having a plurality of nodes or edges. The data of each node or edge may be represented by variables in a data structure of the abstract graph of the data (e.g., a data array). The other sub-problems of a different type may be represented as a set of additional variables in the data structure of the abstract graph. That is, each type of sub-problem that is not defined as the main complex problem is represented by specific variables. Representing different types of sub-problems by different variables on a single graph enforces strict constraints on the expanding process of the sub-problems and it reduces the flexibility and the modularity of the solution as it develops. For example, all the variables and thus, all sub-problems, are bound together with the same expanding level of the complex problem. Thus, a solution method cannot proceed to solve a sub-problem of an advanced level until all the sub-problems of the current level are completely expanded or solved. This solution method restricts the ability to concurrently solve different types of levels of sub-problems, which may halt potential progress. In addition, this solution method restricts the ability to expand the sub-problems in a distributed approach (e.g. using more than one processor to resolve a complicated problem). Furthermore, this solution method reduces the ability to exploit knowledge of an expert in a specific type of the sub-problem when expanding the graph.

According to embodiments of the present invention, a complicated problem describes a plurality of sub-problems. Each sub-problem is represented by a respective one of data structures such as for example a plurality of abstract graphs. The data structures, such as graphs, representing sub-problems, may be represented in a computer system. Each of the plurality of abstract graphs may be expanded separately. Thus, each sub-problem may be solved independently of other sub-problems. There may be associations between components (e.g., nodes and/or edges) of the plurality of abstract graphs. Each component may represent different level of abstraction of the problem. Hence, unlike existing techniques, in which a complicated problem is represented by a single abstract graph, according to embodiments of the present invention, associations between multiple abstract graphs provides more flexible and modular fashion to resolve problems. Furthermore, the complicated problem may be resolved in a distributed approach as each sub-problem can be resolved independently.

Given a complicated problem to be resolved in a large search space or under uncertain and dynamic real-world conditions, according to embodiments of the present invention, the complicated problem may be divided into a plurality of sub-problems. Each sub-problem may be used in a large search space or in and dynamic environment. A search space is a solution set including all permutations of outcomes. An environment may be a set of propositions that define the state or parameters of a problem. A dynamic environment is an environment in which the propositions may change. Each sub-problem may be solved separately (e.g. using abstraction based technique). Thus, each sub-problem may be represented by a separate abstract graph and may be resolved in its own way and at its own pace. According to embodiments of the present invention, components of one abstract graph may be associated with some components of another abstract graph. The association between different graphs may allow integrating multiple types of sub-problems. The plurality of associated abstract graphs may be concurrently and dynamically extended, based on predetermined or dynamic propositions of the environment. That is, at any stage of the solution development, different levels of abstractions of different types of abstract graphs may be associated dynamically and partial solution may be applied on the environment.

Embodiments of the present invention may be applied in a variety of applications. Although the present invention is not limited in this respect, the techniques disclosed herein may be implemented in many apparatuses such as personal computers (PCs), workstations, wireless devices or stations, video or digital game devices or systems, image collection systems, processing systems, visualizing or display systems, digital display systems, communication systems, simulation systems, unmanned systems, robotic systems, and the like.

The sub-problems that represent a complicated problem may be different types of problems or similar types of problems that are resolved in a different way (for example, two path finding sub-problems using different representations such as quad-trees or clique). According to embodiments of the present invention, abstract graphs are used, representing full or partial solutions to the sub-problems of which the complicated problem is comprised, and associations applied between components of the abstract graphs as appropriate.

According to embodiments of the present invention a system or method may represent a plurality of sub-problems having components (nodes and edges) of a complicated problem in separate abstract graphs. At least one, but preferably more, of the graphs are abstract graphs. Some abstract graphs need not be solved to proceed with solving other abstract graphs. An abstract graph is a data abstraction. An abstract graph may be any representation of a graph, for example, the graph itself, a database, an array, tables, strings in software, data elements that may be used to assemble a graph, instructions for assembling a graph, a map of relationships defining a graph, vectors, maps, hash-tables, an ordered set, a hierarchical organization of data, a tree graph, or any other an abstraction of the graphical data. An abstract graph may be a private case of graph which may be dynamically expanded. The abstract graph may have a plurality of nodes having available data or information. Available data may be data that may be retrieved from memory without further expansion of the abstract graph to increased levels. The abstract graph may be expanded to increased levels to increase the number of nodes (and edges) and thus, to increase the amount of available date corresponding thereto. The abstract graph may have the potential to be (but it is not required to be) expanded to increased levels of abstraction. For example, an abstract graph may have a solution that may remain unsolved or partially solved.

According to embodiments of the present invention some sub-problems may be considered optional or alternative. Hence, according to embodiments of the present invention, not all the sub-problems of a complicated problem need to be solved. Some sub-problems may be left unsolved, to be solved as the sub-problem abstract graph unfolds and progresses.

The order in which the sub-problems are solved may depend on dynamically changing conditions, such as, for example, changes in the environment, goal changes, local or general constraints, and other factors. Each time a partial solution of any of the sub-problems is extracted it influences the conditions and the environment.

A suggested representation according to embodiments of the present invention includes multiple abstract graphs with association links between their components (nodes and/or edges). Other data representations may be used. Each abstract graph represents a specific sub-problem having a solution that may be incomplete at any stage of the solving process. The integration between the sub-problems is executed by dynamically associating nodes, edges or any other component of the abstract graphs.

Since each sub-problem may be influenced by an uncertain and dynamic environment, it may be impractical to achieve complete knowledge about the environment. Thus, the solution of each sub-problem is represented using abstraction. Each sub-problem may be represented by separate abstract graphs and may be solved in its own way and pace (based on the partial knowledge available at the time). Thus, in contrast to conventional techniques in which a complicated problem is represented by a single abstract graph, embodiments of the invention represent a complicated problem by a plurality of associated abstract graphs with different levels of abstractions.

Association between abstract graphs is a process that connects one component (node and/or edge) of a partial solution of one sub-problem to a component of a graph of another partial solution of another sub-problem. An association may be, e.g., a pointer, a map, instructions, or other data structure, that indicates a relationship between components. The association process may use a connection (e.g., such as a pointer) to direct information from one partial solution to the other to facilitate further resolving or expansion of both abstract graphs. The association process is done dynamically and may be based on predefined rules (e.g., specific component may be associated with another component if both components satisfy specific constraints). Hence, embodiments of the present invention facilitate more flexibility and modularity during the refinement of partial solutions. Furthermore, the complicated problem may be resolved in a distributed approach, in which each sub-problem may be resolved independently and/or on different host computers.

Embodiments of the present invention include computer implemented methods, for example in computer simulators, where complicated problems, such as configuring the behavior of virtual characters or other entities, may be solved and put to practice, by solving some but not all of the sub-problems representing the complicated problem.

There is a great need in the art to provide a method for solving a problem, described as (divided into) a plurality of sub-problems, in which some or all of the sub-problems are separately and only partially solved.

Reference is now made to the figures.

FIG. 1 illustrates a graph representation of a complete solution to a complex problem (PRIOR ART). The graph is an example of a hierarchical task network (HTN), which is typically used by a problem solver to determine a sequence of executable (e.g., atomic) tasks that achieve a mission. The graph represents the mission 10 in hierarchical manner, in which the mission 10 is composed of several lower-level sub-tasks 12. The sub-tasks 12 may each be further composed of other still lower level sub-tasks 14, which may in turn be composed of lower level sub-tasks 16 or of atomic tasks 18. The term "atomic" may refer to an executable task that need not or cannot be further divided into lower level sub-tasks. Accordingly, the highest-level node represents the mission 10 and lower level nodes represent sub-tasks 12, which may be composed of lower level sub-tasks 14 (or 16) or atomic tasks 18. The lowest sub-tasks are atomic tasks 18. The nodes of the graph may be connected by different types of edges 20. The arrangement of nodes and edges 20 and the number of levels of sub-tasks, typically depends on the type of the problem.

The graph of FIG. 1 schematically illustrates a fully solved (complete) solution to the task-planning problem represented by a complete graph. The complete graph includes a main task (mission 10) that is deconstructed into lower-level sub-tasks having atomic executable tasks at the lowest levels of each branch. The greater the number of iterative steps, the greater the number of nodes, and the greater the level of abstraction. An abstract graph with one node may have a level zero of abstraction; an abstract graph with two nodes may have a level one of abstraction; etc. As the solution is refined, the number of levels of the abstract graph is increased. The corresponding additional nodes and edges corresponding to increased number of levels are typically kept in the data-structure of the abstract graph.

Nodes and edges are data structures which may for example be stored in a memory of a computing system. The data structure may include, for example, bits of an array, vectors, maps, hash-table entries.

Figure 2:
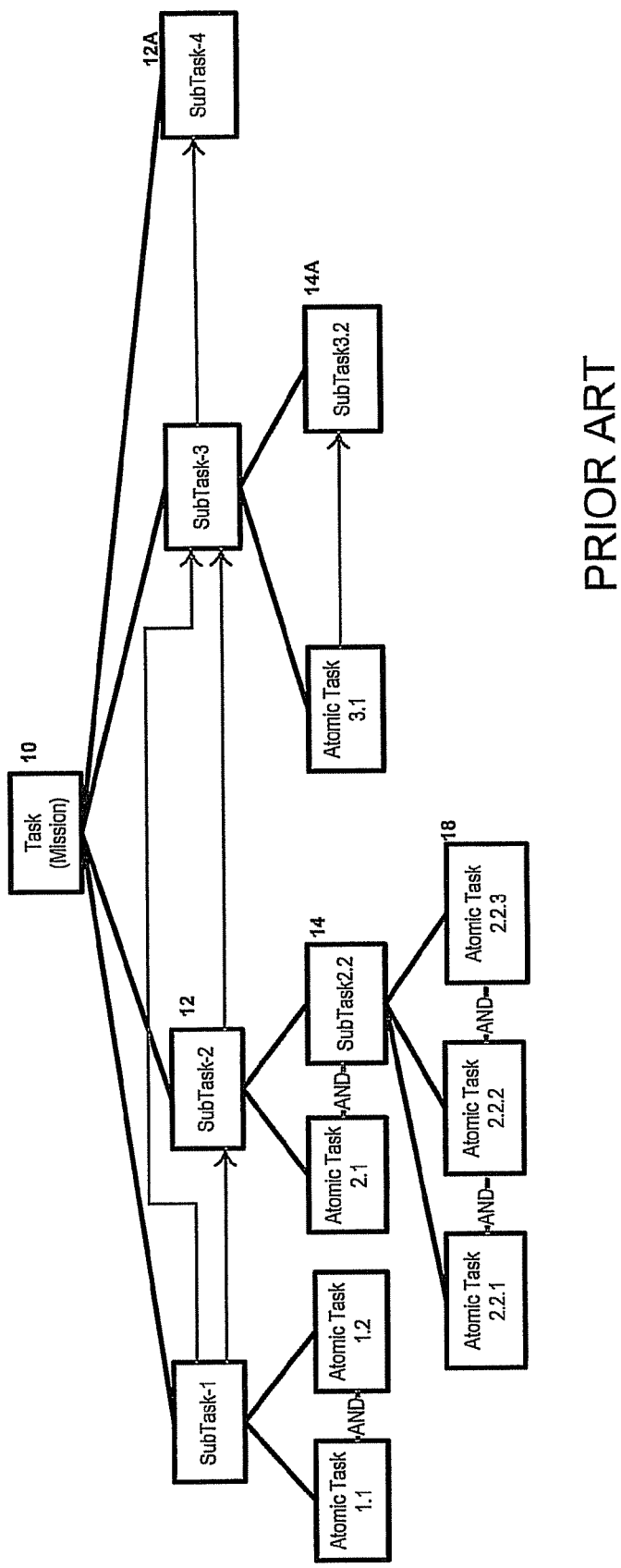
FIG. 2 is a partial graph of the graph of FIG. 1 in which the complex problem is partially solved (PRIOR ART).

FIG. 2 schematically illustrates a graph representation of a partial solution to the complex problem of FIG. 1. The mission 10 is partially solved. Partial solutions to the mission 10 include sub-tasks 12, which are decomposed to lower level sub-tasks 14, and have atomic tasks 18 at the lowest levels of each branch of the graph. However, other sub-tasks 14A, 12A are unsolved (e.g., not decomposed into atomic tasks).

Figure 3:
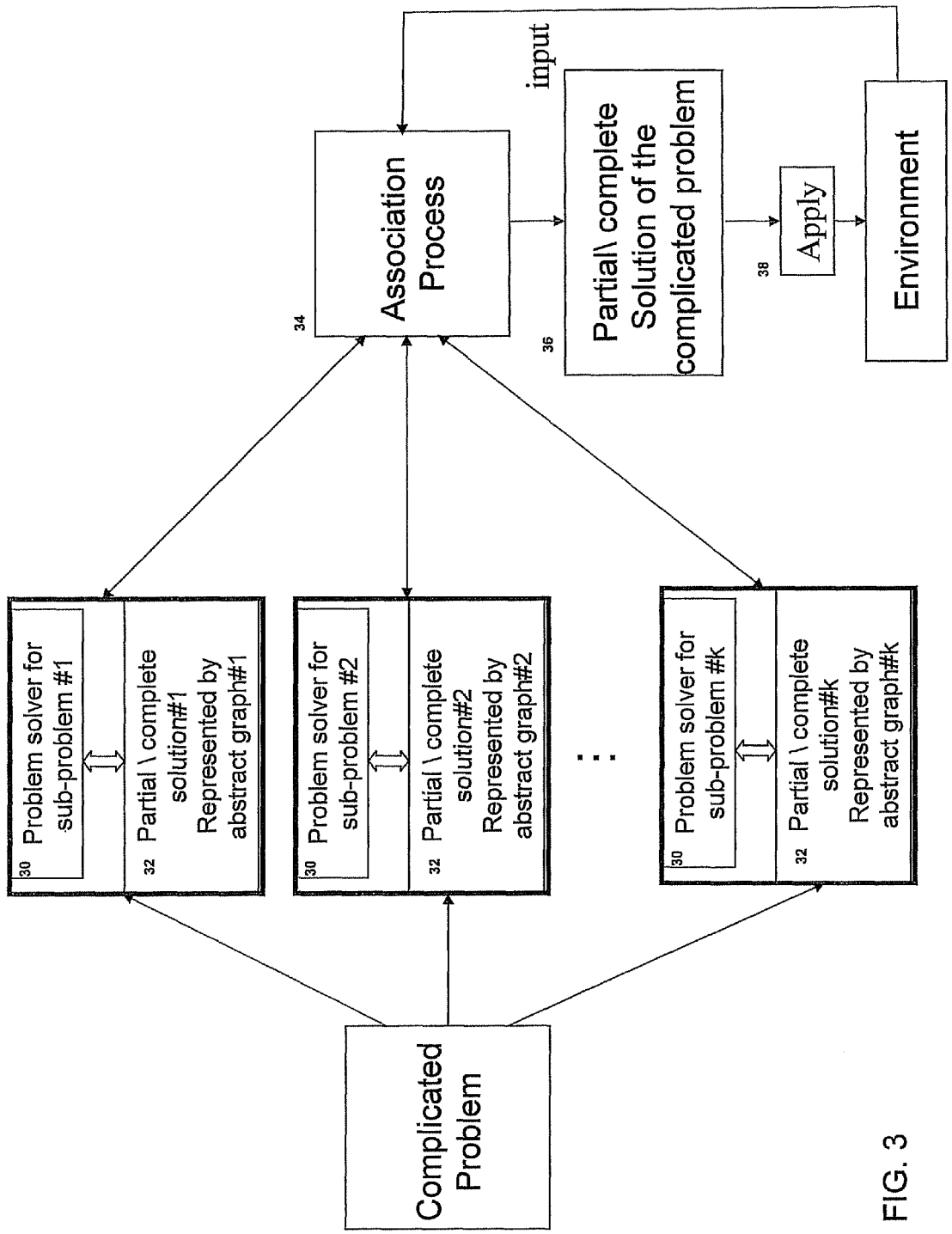
FIG. 3 is a flow chart of a method for solving a complicated problem according to embodiments of the present invention.

FIG. 3 schematically illustrates a flow chart of a method for solving a complicated problem according to embodiments of the present invention. According to embodiments of the present invention, the complicated problem is divided into an integer number, k, different sub-problems. Alternatively, some, but not all, of the sub-problems may be the same or similar. Each sub-problem, 1, 2, . . . , k, is represented by an abstract graph. There are k problem solvers for k sub-problems 30. Problem solvers for sub-problems 30 may be denoted as Sub-Problem 1 (SP1), Sub-Problem 2 (SP2), Sub-Problem 3 (SP3) and up to Sub-Problem k (SPk). The dots in the figure indicate the existence of more sub-problems that, in order to avoid over-crowding of the figure, are omitted.

A processor may solve each sub-problem independently, e.g., in its own way or pace, based on the abstract graph corresponding thereto to generate either a partial solution or a complete solution 32. An association process 34 may be used to associate the partial or complete solutions 32 of the plurality of sub-problems 1, . . . , k, in order to generate either a partial solution or complete solution 36 for the entire complicated problem.

Association process 34 between partial or complete solutions 32 may be carried out depending on when the problem solvers for sub-problems 30 provide the partial or complete solutions 32. The order in which the partial or complete solutions 32 are provided depends on the complexity of each sub-problem, the availability of information required to solve each sub-problem, and a variety of other factors that may be determined dynamically as the solving process unfolds. For example, SP1 may be expanded down two levels before proceeding to expand SP2. The partial solution of SP1 to two levels may be used to expand SP2. Alternatively, it may be possible to start solving SP2 and when a certain level of abstraction is reached, using information from SP1 (or other SP) obtained from a related level (e.g., information which may be necessary) to solve a current level of sub-problem SP2.

The association process 34 serves as an intermediate between the sub-problems solvers. The association process 34 bridges the partial solutions of the different sub-problems in order to apply 38 the integrated solution to the environment. The association process 34 may associates one or more components of one abstract graph with one or more components of another abstract graph according to predefined propositions. The association process also may control and coordinate the interaction of the different problem solvers and may provide them with necessary information. The association process 34 enables loose coupling between problem solvers by allowing each of them to modify the corresponding abstract graph independently. Furthermore, as the problem solvers interact only with the association process 34 (e.g., instead of with each other), the number of interconnections is reduced. Alternatively, one or more (e.g., specific) problem solvers may interact with other problem solvers.

Figure 4:
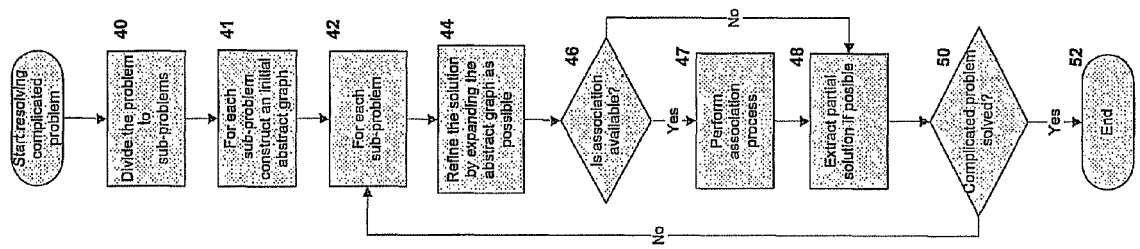
FIG. 4 is a flow chart of a method for solving a complicated problem according to embodiments of the present invention.

FIG. 4 is a flow chart showing steps of solving a complicated problem, according to embodiments of the present invention.

In operation 40, the main complicated problem is divided into a plurality of sub-problems. The main complicated problem may be divided prior to processing by a user or, alternatively, during processing by a processor. Each abstract graph may include an ordered set of nodes.

In operation 41, an initial abstract graph is constructed for each sub-problem. The abstract graphs may be constructed in a computing system by a processor.

In operation 42, one of the sub-problems is selected.

In operation 44, the sub-problem is iteratively decomposed by expanding the abstract graph as much as possible using available data.

In operation 46, an association process determines if an association exists between the sub-problem selected in operation 42 and other sub-problems. The association process establishes an association between a first node of a first abstract graph of the abstract graphs and a second node of a second abstract graph of the abstract graphs. The association process determines associations between nodes according to predefined association rules, e.g., as specified by a user or computer. An association may be made using an algorithm to determine nodes having specific data that satisfies predetermined criteria. The predetermined criteria by which nodes are associated may include, for example, a common nodal structure, a similarity in the data represented by the nodes.

If there is no valid association to another sub-problem, a process may proceed to operation 48.

In operation 48, a current solution is extracted.

In operation 50, it is determined if the achieved solution is satisfying (e.g. a complete or partial) solution to the complicated problem. The complicated (main) problem may be solved, for example, by a human, the same or a different processor, and/or by other software modules (e.g. a simulator)

If the achieved solution is satisfying, the process may end at operation 52. If however the achieved solution is not satisfying, the process may proceed to select another sub-problem and operations 44-50 are repeated for the selected sub-problem.

If available data cannot be used to solve (decompose) an abstract graph corresponding to a sub-problem and there exists a valid association to another node, then an association is performed 47. The processor may switch to the associated node for either retrieve necessary information to solve the current sub-problem or solve the associated sub-problem. The process tries to extract a current solution 48 to the associated sub-problem.

Accordingly, a processor may, for the abstract graphs representing the sub-problems of the complicated problem, for each of an ordered set of nodes thereof and according to the ordering of the nodes, iteratively attempt to retrieve available data at each node, and if the available data cannot be used to solve the sub-problems corresponding to the abstract graph, the processor may switch to iteratively attempting to retrieve available data for a different node of a different abstract graph of the abstract graphs. If the processor cannot use available data to solve the sub-problems corresponding to a first abstract graph, the processor may use data which is a result of solving the sub-problem corresponding to a second abstract graph.

Solving sub-problems simultaneously may expedite the solution of the main complicated problem.

Resolving, solving, and/or finding a partial or complete solution to, an abstract graph may refer to generating a result, or alternatively, attempting to generating a result, which may be unsuccessful.

An initial data structure (e.g., an abstract graph) is constructed for each sub-problem that is a component of the complicated problem (e.g., of FIG. 4). The construction of the initial graph may be based on given knowledge about the environment (which may be, and for many real-world problems is indeed, partial) and the type of the complicated problem. As refinement is carried out, new parts of the solution (sub-problems of relatively lower levels) may be extracted from each sub-problem. The refinement process may be iteratively done at each level until the solution is completed. At each stage (e.g., level) of the refinement an association process (e.g., association process 34 of FIG. 3) may be performed. Partial solutions of the sub-problems may be associated, e.g., by transferring information of the solution from one abstract graph to another. The association process may be a separate process from the expansion of the abstract graph.

The expansion of the abstract graph may be carried out using expert knowledge relevant to the specific sub-problem being solved.

Consider the following example related to training and simulation systems. It is typically desired, in the field of simulation systems, to provide computer generated force (CGF) entities with realistic behavior, as is know in the art. Envisaging and pre-programming in advance all the possible situations and events that may occur in a dynamically changing simulation system may be impractical. The CGF entities may be used to plan a joint mission autonomously as new opportunities and changes are recognized in the simulation system.

One non-limiting example of an embodiment of the invention is training systems scenarios. In training systems scenarios a mission that is performed jointly by multiple CGF entities may be a complicated problem that comprises two problem solvers, e.g., a task planner and a team planner. Each problem solver is represented by a separate abstract graph. The abstract graph for the task planner may be constructed, for example, using a hierarchical planning strategy that exploits well-designed hierarchies of a task, which is known as a Hierarchical Task Network (HTN) planner. The team planner may organize teams into sub-teams according to their competence, resources, availability and other related information. At any stage of the planning development, each planner may generate only a partial plan (based on its current partial knowledge), which may be repeatedly refined to become more complete as new knowledge is gathered. An association process may integrate the partial plans dynamically as the partial plans are refined. The solutions to the partial plans may be integrated and applied to the environment of the problem. Accordingly, planning and execution are interleaved.

Figure 5:
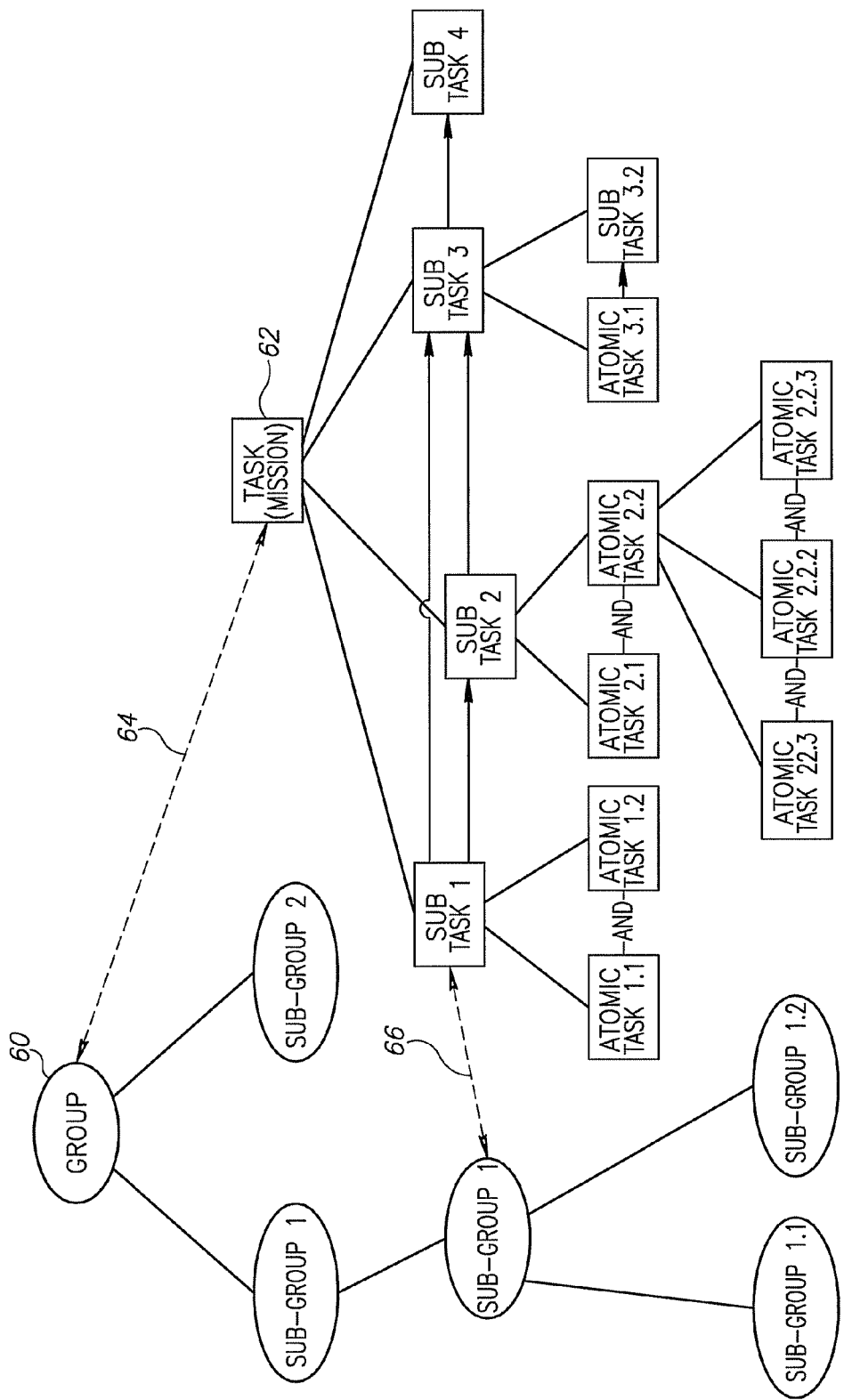
FIG. 5 illustrates a graphical representation of a complicated problem divided into two sub-problems represented by two abstract graphs, with associations between the abstract graphs, according to embodiments of the present invention.

FIG. 5 schematically illustrates two associated graphs 60 and 62, according to an embodiment of the present invention. Each graph represents a different sub-problem of the complicated problem (e.g., a mission that is performed jointly by multiple CGF entities).

The task graph 62 is an abstract plan of the mission. The task graph 62 is maintained by a task planner. The tasks are represented as nodes and the relationships between the tasks are represented by edges. Similarly, the team tree 60 is an abstract plan of the team. The team tree 60 is maintained by the team planner. The teams are represented as nodes and the hierarchies among the teams are represented by the edges. The graphs of both planners are extended (e.g., solved at least partially) dynamically. The association process determines associations 64 and 66 between the task graph 62 and the team tree 60. The task graph 62 is complete when all the tasks are deconstructed into lower level sub-tasks until the lowest level of each branch of the graph is an atomic executable task. The team tree 60 is complete when all the teams are deconstructed into sub-teams having relatively fewer players until the lowest level sub-teams are individual CGF entity.

Consider for example, when the main task is complicated problem to "attack ground station" by an "Aircraft Force". The mission may be deconstructed using several methods. Each method is appropriate for a specific situation in the environment. For example, in order to attack the ground station the force may use a low attack approach or a high attack approach. The task planner selects the best approach (or partial solution) according to the current knowledge about the environment. If the environment is a well-secured ground station, the force may prefer the high attack approach, which is typically safer in these conditions.

After the planner selects the appropriate approach it deconstructs the task into sub-tasks. For example "attack ground station" according to the low attack approach may be deconstructed into the following sub-tasks: "organize to attack", "fly to target", "air attack" and "ground attack". Yet, in an uncertain and dynamic environment, the knowledge about the environment is incomplete and further deconstruction of these sub-tasks may be required to consider additional information about the environment, which may be unknown at the time of initial planning and which may be revealed later. Using the abstract based technique enables the integration of new information as the partial solution is carried out. In a similar way, the team planner may deconstruct the "Aircraft force" into sub-teams in different ways (e.g., four-ship formation, two-ship formation, etc.).

The associations 64 and 66 between the task graph 62 and the team graph 60 may be subjected to constraints of the sub-plans. For example, the performance of the "air attack" sub-task may be constrained by a requirement that the aircraft formation include at least four aircraft with two leaders. Constraints may be passed on from the association process to the team planner. The team planner is then responsible for planning a team that satisfies these constraints. When an appropriate team is planned the association process associates the node in the task graph 62 that represents, for example, the "air attack" sub-task to the node in the team tree 60 that represents the appropriate team.

Figure 6:
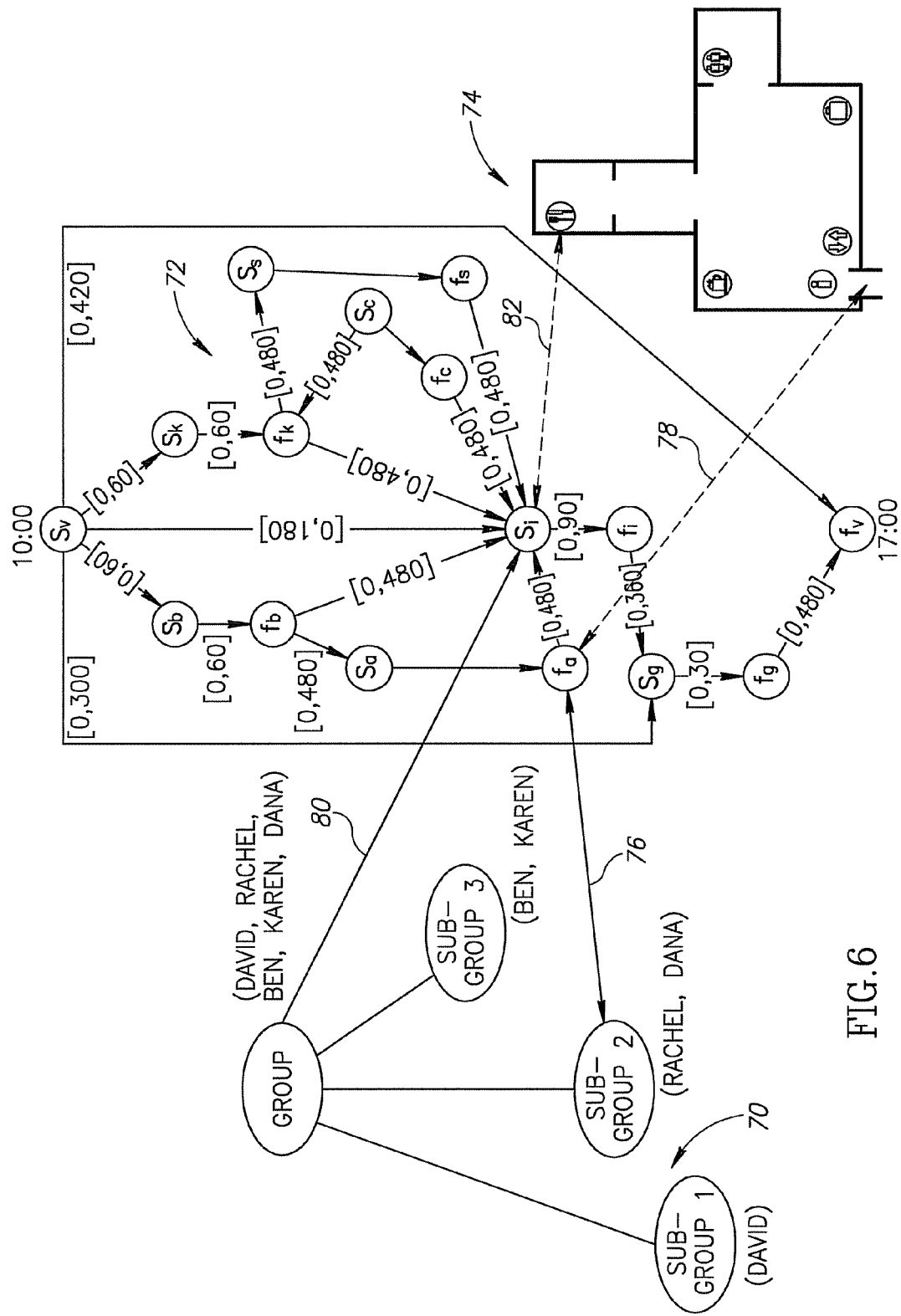
FIG. 6 illustrates a graphical representation of a complicated problem, e.g., planning a day in the museum for a family, solved by dividing the problem into three sub-problems each of which is represented by a respective one of three abstract graphs, the graphs having associations therebetween, according to embodiments of the present invention.

FIG. 6 schematically illustrates another non-limiting example of a technique for solving a complicated problem. Consider David and Rachel and their children Ben, Karen and Dana who are planning a one day visit to the Natural History Museum. Ben is 12 years old. Karen is 7 years old. Dana is 3 years old. The museum's opening hours are between 10:00 to 18:00. The museum offers daily activities, events and temporary exhibitions. Example of activities include: workshops, games, food and beverage breaks and film screening. Several activities may have hard temporal constraints, e.g., the Galapagos movie is screened between 3:00-3:30 p.m. In addition, the activities may include constraints on the participants (e.g., some activities are designated only for young children, some other activities are designated for adults and yet other activities are classified as family activities). According to embodiments of the present invention a method may plan small group visits to a museum (e.g. "day in the museum"). The plan is to lead the visitors in the museum according to their profile by tracking the progress of each individual and adapting the visit to each member. There are several environmental conditions and constraints that need to be taken in account when planning a day in the museum, including, for example: opening time-closing time of the museum; shows and activities that take place periodically at certain times during opening hours; locations of the shows, expeditions, refresh rooms, gift shop, restaurants; schedules and opening hours of each of the above; for example, if lunch time is between 12:00 to 14:30, it should be included in the schedule; and choosing activities according to the specific interests of the visitors (e.g., preferences).

Parent interests may conflict with children interests: certain activities are intended for children leaving the parents with time to address their own interests, e.g., other shows occurring at the same time, certain expeditions, leisure (food, gift shop, resting). Parental activity should normally end before children activity to allow the parents (or at least one parent) to fetch the children when they are done.

The planned visit may allow dynamic changes of the plan after the schedule has been set; e.g. substituting parts of the plan with alternative activities, for example if museum schedule is changed or in case of changes of interest of the children or parents. The plan may also offer interactivity, such as, for example, providing audio material which is child oriented/parent oriented, presenting information according to the type of listener; presenting information about group members; informing the visitor of a nearby leisure center and restrooms; reminding the visitor of the next activity scheduled, location of that activity and start time.

According to embodiments of the present invention the complicated problem of "planning a day in the museum" is divided into a plurality of sub-problems in which each sub-problem is represented in a separate abstract graph and is resolved according to an abstraction based technique. For example, "planning a day in the museum" may be split up into the following sub-problems:

One sub-problem is defined as building a plan of the preferred activities taking into account temporal constraints. The solutions may take into consideration the personal preference of each individual in the group while taking into account the opening-closing times of each activity in the museum and may also include changes in the schedule.

Another sub-problem is defined as planning navigation plan of the tour. The solutions are based on knowing the physical position of each individual and are aimed at leading each of them to the area of their activities.

A third sub-problem is defined as organizing the group into subgroups. The solutions are aimed at organizing the subgroups according to constraints (e.g., Dana must be accompanied by an adult). In addition, the solutions are aimed at organizing the family into sub-groups while taking into account personal preferences. For example, Ben is less adamant about the topic of the activity if it means being with Karen. Karen is interested is snakes, but Ben is afraid of reptiles. Karen wants her brother to be with her, but is not willing to miss the snake exhibition, thus, in this case, Karen is indifferent if Ben will be with her.

Each of the above sub-problems may be represented by a separate abstract graph.

An abstract graph 72 of the first sub-problem may be based on temporal Constraints Network.

A navigation graph 74 of the second sub-problem may be based Navigation graph.

A hierarchical tree 70 of the third sub-problem may be to organizing the group into subgroups.

Suppose, for example, that the family arrived to the museum at 10:00 and plans to leave the museum at 17:00. They plan their lunch time at 13:00 and it is decided that in between David will attend the Galapagos film screening between 15:00-15:30. In addition, it is decided that Ben and Karen will join the Botany Explore tour between 11:00 to 12:00 and Dana will join the Kids Only Game. The other activities have not been planned and may be planned dynamically as the tour progresses. In addition, several changes in the plan may occur. The variables $s_j$ and $f_j$ are used to represent the start time and the finish time of activity j. The activities associated with their temporal constraints may be represented as a simple temporal network. The simple temporal network is a directed graph where nodes denote time points and every arc represents a single temporal constraint defined on two time points. That is, the nodes $s_v$ and $f_v$ denote the start time point and the finish time point of "visit the museum" activity. Similarly, $s_l$ and fl denote the lunch, $s_b$ and $f_b$ denote the Botany Explore tour, $S_k$ and $f_k$ denote the Kids only game and $s_g$ and $f_g$ denote the Galapagos movie. The arc between the time points $s_j$ and $f_i$ of the activities i and j denotes available delay between the activities. Then, a known technique of solving constraints satisfying problems may be used to determine if there is any inconsistent constraint that collides with the exact start time and finish time of each activity. At any level of developing the plan the graph is abstract and may be expanded as new activities are added to the tour. Suppose for example that it was decided that after the Botany Explore tour Ben and his father will go to the computer games while Karen will go to the Snake exhibition and Rachel will go with Dana to the Amazing Butterflies Exhibition. The new activities are added to graph 72 as shown in FIG. 6 where $s_c$ and $f_c$ denote the computer game, $s_s$ and $f_s$ denote the Snake exhibition, and $s_a$ and $f_a$ denote the Amazing Butterflies Exhibition. In addition, the graph may be changed if museum schedule changes or if the interests of the visitors change. Changes in the graph are done by deleting or adding arcs and by changing arc values.

The purpose of the navigation graph 74 is to lead the visitor to the appropriate activity. The hierarchical tree 70 represents the visitors group (the entire family) in which the second level of the tree represents possible subgroups. Members of subgroups may be changed during the tour.

In order to lead each member in the museum according to his/her preferred activities, associations between the required activity, the appropriate area and the appropriate participant are done. As shown in FIG. 6, it is assumed that Rachel and Dana should arrive from the Amazing Butterflies Exhibition (near the lift) to the restaurant. Thus, the node that represents Rachel and Dana has an association 76 with the finish time and an association 78 with the area of the Amazing Butterflies Exhibition. In addition, the node of the all family has an association 80 with the with start time point of the lunch-time and concurrently an association 82 with the area of the restaurant. When the time of the next activity arrives (according to the temporal constraint network) the solution of the navigation graph 74 will lead the family to the location of the next activities. In addition, the solutions of the temporal constraint network graph 72 may provide information about the time period to go from the exhibition to the restaurant from the navigation graph 74 in order to leave enough delay time between the activities.

The solution (e.g., either a partial or complete solution) to the "day in the museum" mission may be displayed to a user, e.g., on a (e.g., hand-held or mobile) computing system (e.g., such as a global positioning system, a cell phone, etc.). A user interface shown on for example a monitor may display the solution. The computing system may display solutions to one or more of the sub-problems. For example, the computing system may have a map display, indicating a path to take through the museum. For example, the computing system may have a time display with a clock and alarms set (e.g., to vibrate (required during the movie session) or a selected ring or audio sample). For example, the computing system may have a team display, including caricatures of each group member and their fellow members. When the computing system is in one example a global positioning system, the computing system may identify if a user deviates from the plan and adjust the plan accordingly. In addition, the users may track or locate other users.

If solutions to an abstract graph representing one sub-problem are impossible, irrelevant, or rejected (e.g., by a user or a computer), a processor may return to a higher node and use alternative solutions that would be possible and suitable to associate with other solutions of a corresponding sub-problem (represented by another abstract graph).

Figure 7:
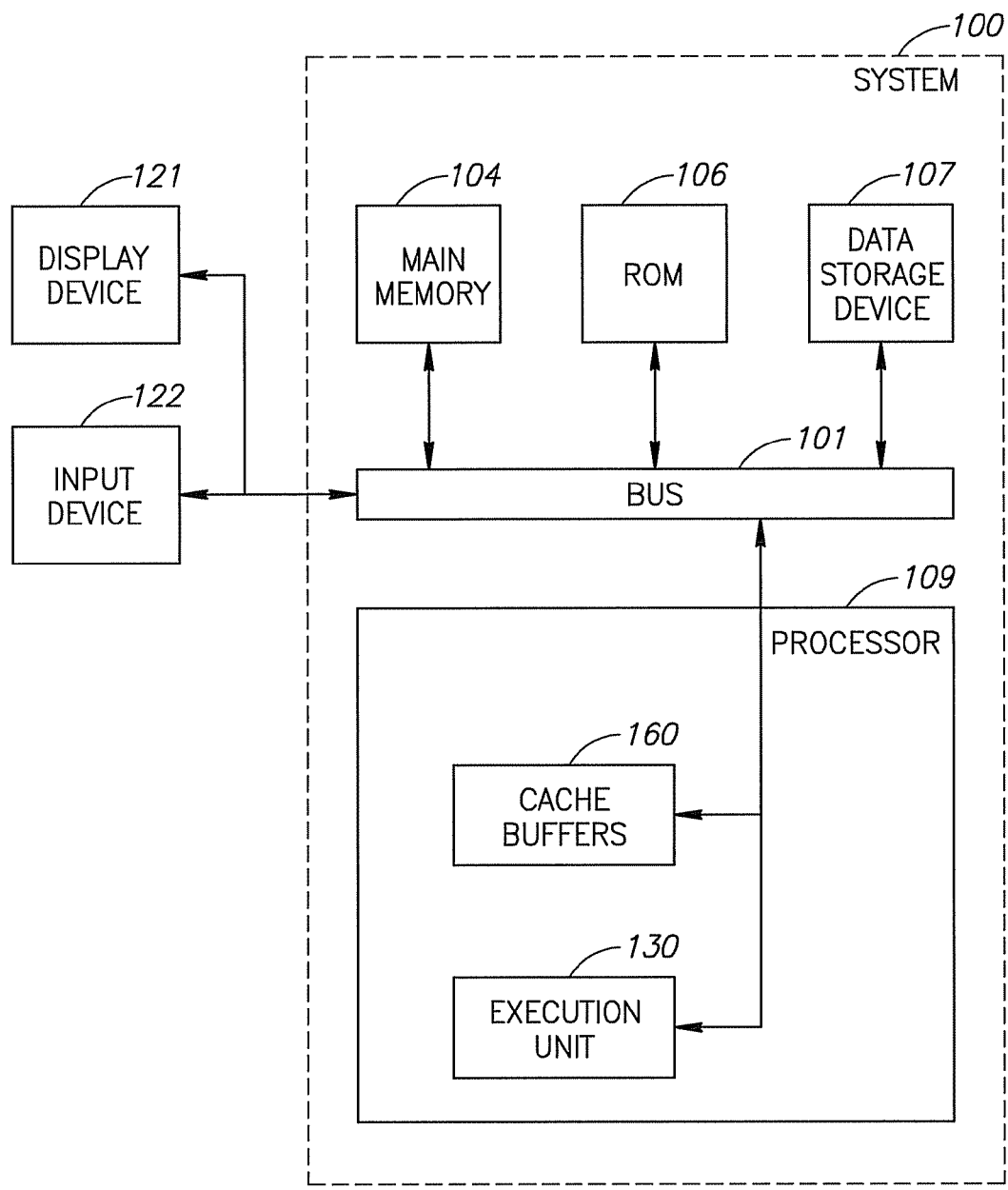
FIG. 7 illustrates a system according to an embodiment of the invention.

Embodiments of the present invention including computer implemented methods for solving complicated problems and may be carried out wholly or partially on a computer system, for example, as described in FIG. 7.

Reference is made to FIG. 7, which schematically illustrates a system 100 according to an embodiment of the invention. System 100 is an example of a computer system that may be used with embodiments of the present invention. Other types of computer systems, not shown, that are configured differently, may also be used with embodiments of the present invention. Computer system 100 may include a bus 101, or other internal communications hardware and software, for transferring information, and a processor 109 coupled to the bus 101 for processing information.

Processor 109 may be for example a controller, a central processing unit (CPU) or multiple processors having any suitable architecture. Processor 109 may include for example, an execution unit 130, a cache 160, and an internal bus, although other or different components may be used.

Computer system 100 may include a random access memory (RAM) or other dynamic storage device in main memory 104 coupled to the bus 101 for storing information and instructions to be executed by the processor 109. Main memory 104 may be used for, for example, storing temporary variables or other intermediate information during execution of instructions by processor 109. Computer system 100 may include a read only memory (ROM) 106, or other static storage device, coupled to the bus 101 for storing static information and instructions for the processor 109. Computer system 100 may include a data storage device 107, such as a disk drive and may be coupled to the bus 101.

The computer system 100 may be coupled via the bus 101 to a display device 121 for displaying information to a user of the computer system 100. For example, display device 121 may display the complete solution, or the solution to the main problem, for a problem being solved. Display device 121 may include a monitor or screen, which may include or display for example a user interface, but the invention is not so limited. One or more input device(s) 122, such as a keyboard and/or mouse, may be coupled to the bus 101 for communicating information and command selections to the processor 109.

The processor 109 may receive a command or set of instructions for executing an operation for solving a complicated problem, from the input device 122 or a memory location (e.g., main memory 104, ROM 106, or data storage 107). The complicated problem may be represented by a plurality of sub-problems stored in a memory location. The complicated problem may be decomposed into sub-problems by a user (e.g., prior to input into the computing system 100, via input device 122) or by processor 109. Each sub-problem may be represented for example by an abstract graph. Each abstract graph is represented by a data structure, such as, for example, an array, vectors, maps, hash-tables.

Each abstract graph may include a plurality of nodes. Each node may correspond to a memory location (e.g., main memory 104, ROM 106, or data storage 107) for storing data associated with the node. The data may be stored as a data element of the data structure of the abstract graph (e.g., including an element of an array, a vector, a map, an element of a hash-table).

Two or more of the sub-problems may be associated. Instructions for executing an algorithm (e.g., such as the association process 34 of FIG. 3) may be stored in the cache 160 or another memory location for associating a first node of a first abstract graph corresponding to a first sub-problem with a second node of a second abstract graph corresponding to a second sub-problem.

Embodiments of the present invention may include an article such as a computer or processor readable medium, or a computer or processor storage medium, such as for example a memory, a disk drive, or a USB flash memory, encoding, including or storing instructions which when executed by a processor or controller, carry out methods disclosed herein.

Figure 8:
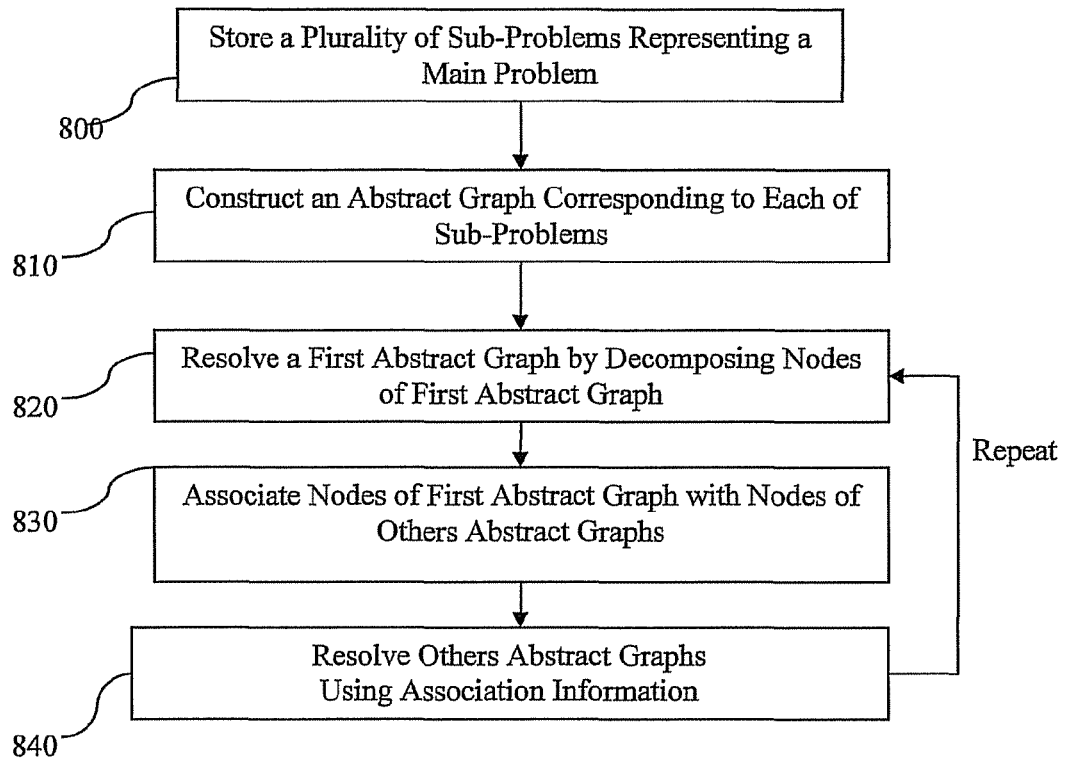
FIG. 8 is a flowchart of a method according to an embodiment of the invention.

Reference is made to FIG. 8, which is a flowchart of a method according to an embodiment of the invention. Embodiments of the method may be used by, or may be implemented by, for example, system 100 of FIG. 7 or other suitable systems.

In operation 800, a complicated problem is represented, in a data structure in a computing system, having a plurality of sub-problems. The problem may be stored in the computing system. The complicated problem may be divided into sub-problems by a user and/or a computer. The complicated problem may pertain to an environment. For example, the complicated problem is defined by a series of propositions (e.g., parameters) according to the environment.

In operation 810, an abstract graph is constructed which corresponds to each of the sub-problems (e.g., using abstraction based techniques). While the term "graphical" is used when describing a representation of the sub-problems, typically, such a representation is an internal representation, in for example a computer memory, rather than as a visual display to a user (until and unless the data is displayed to the user in some form). Typically, the internal representation is a data structure (e.g., an array, vectors, a hash-table) that is not itself a graph, but defines a graph. Typically, only the ultimate solution to a main problem is displayed to a user. However, intermediate solutions or problems, such as sub-problems, graphs corresponding thereto, questions to prompt user input, etc., may be displayed to a user. Each abstract graph may include a plurality of nodes (vertices) and/or edges. The nodes may be, for example, arranged in hierarchical levels. A plurality of the graphs may have different arrangements of the nodes from each other. For example, at least one of the graphs may have numbers of nodes, numbers of levels of nodes, numbers of branches connecting the nodes, and/or graph structures or types that differ from another one of the abstract graphs.

In operation 820, a processor attempts to expand the first abstract graph corresponding to a first sub-problem by decomposing a first node of the first abstract graph into a plurality of nodes of a lower level. At least the first abstract graph of the abstract graphs is resolved, e.g., by decomposing one or more nodes of the first abstract graph. The data of each abstract graph is kept in its own data-structure.

In operation 830, instructions may be retrieved from a computer memory for determining an association (e.g., a pointer) between at least one of the plurality of decomposed nodes and a second node of a second abstract graph corresponding to a second sub-problem. The association may be made using an algorithm according to association rules. The algorithm may determine nodes having specific data that satisfies predetermined criteria. For example, the predetermined criteria may be determined by an expert or intelligent software in a computer. The predetermined criteria that determine an association may include, for example, a common nodal structure, a similarity in the data represented by the nodes or other graphical features.

In operation 840, the processor uses information pertaining to the at least one node of the one or more nodes of the first abstract graph to resolve (e.g., decompose) the one or more nodes of the others of the abstract graphs. The processor may apply information pertaining to a current partial solution of the abstract graphs to the environment. For example, the processor may apply information pertaining to a combination of the nodes of the abstract graphs to alter the environment of the problem. Alternatively, a user may apply the information. Each of the abstract graphs may be partially or completely resolved. When the abstract graphs are completely resolved, the most abstracted levels of the abstract graphs comprise atomic executable tasks.

Other operations or series of operations may be used.

The processor may repeat the aforementioned steps for the second node in place of the first to solve the second sub-problem.

Embodiments of the invention include solving a main problem. Solving the main problem includes for example constructing a plurality of abstract graphs each graph including nodes. Each abstract graph may represent one of a plurality of sub-problems. The plurality of sub-problems taken together represent a main problem pertaining to an environment. Some of the abstract graphs may have different arrangements of the nodes from one another. For example, the nodes may be arranged in hierarchical levels and the different arrangement of nodes may comprise different numbers of levels of nodes.

At least one node of an abstract graph may be decomposing into at least two corresponding nodes. A subset of the nodes may be associated. The subset of the nodes may be associated by (i) selecting a first node of a first one of the abstract graphs representing a first one of the sub-problems; (ii) selecting one or more second nodes of other abstract graphs representing a second one of the sub-problems; and (iii) creating an association in which information pertaining to the first node of the first abstract graph is associated to the one or more nodes of the other abstract graphs. One or more of the other abstract graphs may be decomposed further using the information and extracting at least a partial solution of at least one of the other abstract graphs. The steps of further decomposing the abstract graphs and extracting at least a partial solution to obtain a solution for the main problem may be iterated for different nodes. Extracting a partial solution of the complicated problem may include applying the partial solution to the environment. Iterating the steps of associating nodes for different nodes and extracting a partial solution for the different nodes may be continued until a satisfying (e.g., complete or partial) solution of the complicated problem is achieved. The first node may be selected to be associated when information necessary for solving the first one of the abstract graphs is missing. The one or more second nodes may be selected according to association rules. The association rules may be provided by an expert. The expert may be intelligent software or a human expert.

Whenever a sub-problem is solved or data is retrieved that contributes to the solution of the sub-problem, the sub-problem (or the solution thereto) and any sub-problem having a node associated therewith may be altered or refined. Thus, as data is iteratively retrieved to update and refine each node of a graph, the nodes and graphs associated therewith are concurrently updated.

When the plurality of sub-problems that represents the complicated problem are solved, the partial solutions may be assembled to form a satisfying solution to the complicated problem.

It may be appreciated by those skilled in the art that a solution for each sub-problem may be solved either by intelligent software program autonomously or with external input of expert knowledge. The expert knowledge may be provided by a human expert (e.g. a user).

It may be appreciated by those skilled in the art that the description of the embodiments and attached Figures set forth in this specification serves only for a better understanding of the invention, without limiting its scope.

The invention claimed is:

1. A computer-readable storage medium comprising a set of instructions that when executed by a processor in a computing apparatus cause the processor to:
construct in a computing system for each of a plurality of independent sub-problems an abstract graph corresponding thereto, wherein the plurality of independent sub-problems represent a main problem, wherein each abstract graph comprises an ordered set of nodes, wherein a first node of a first abstract graph of the abstract graphs is associated with a second node of a second abstract graph of the abstract graphs;
at the first node, determine if available data can be used to solve the first abstract graph to resolve the sub-problem corresponding thereto; and
if the available data cannot be used to resolve the sub-problem corresponding to the first abstract graph, switch to the second node for resolving the sub-problem corresponding to the second abstract graph.

2. The computer-readable storage medium of claim 1, wherein at least one of the abstract graphs has a type that differs from another one of the abstract graphs.

3. The computer-readable storage medium of claim 1, wherein the executed instructions cause the processor to apply information pertaining to a current partial solution of the abstract graphs to the environment.

4. The computer-readable storage medium of claim 1, wherein the association is made according to association rules.

5. The computer-readable storage medium of claim 4, wherein the association rules are predetermined by an expert.

6. The computer-readable storage medium of claim 1, wherein the resolving of the abstract graphs comprises at least partially resolving the abstract graphs.

7. The computer-readable storage medium of claim 1, wherein the executed instructions cause the processor to display on a user interface a solution to the main problem.

8. A method comprising:
constructing in a computing system for each of a plurality of independent sub-problems an abstract graph corresponding thereto, wherein the plurality of independent sub-problems represent a main problem, wherein each abstract graph comprises an ordered set of nodes, wherein a first node of a first abstract graph of the abstract graphs is associated with a second node of a second abstract graph of the abstract graphs;
at the first node, determining if available data can be used to solve the first abstract graph to resolve the sub-problem corresponding thereto; and
if the available data cannot be used to resolve the sub-problem corresponding to the first abstract graph, switching to the second node for resolving the sub-problem corresponding to the second abstract graph.

9. The method of claim 8, comprising:
for each of the abstract graphs, for each of the nodes thereof, iteratively attempting to retrieve available data at each node, and if the available data cannot be used to solve the sub-problem corresponding to the abstract graph, switching to iteratively attempting to retrieve available data for a node of a different abstract graph of the abstract graphs.

10. The method of claim 8, comprising applying a current partial solution of one or more abstract graphs to the environment.

11. The method of claim 8, comprising displaying on a user interface a solution to the main problem.

12. A method for solving a main problem, the method comprising:
constructing a plurality of abstract graphs each comprising nodes, wherein each abstract graph represents one of a plurality of sub-problems, wherein the plurality of sub-problems taken together represent the main problem pertaining to an environment;
decomposing at least one node of an abstract graph into at least two nodes;
associating a subset of the nodes, the associating comprising:
(i) selecting a first node of a first one of the abstract graphs representing a first one of the sub-problems;
(ii) selecting one or more second nodes of other abstract graphs representing a second one of the sub-problems; and
(iii) creating an association between the first and second nodes in which information pertaining to the first node of the first abstract graph is associated to the one or more nodes of the other abstract graphs;

further decomposing one or more of the other abstract graphs using the associated information and resolving least one of the other abstract graphs; and iterating the steps of associating nodes for different nodes and further decomposing to obtain a solution for the main problem.

13. The method of claim 12, comprising applying a current partial solution of one or more of the abstract graphs to the environment.

14. The method of claim 12, wherein at least one of the abstract graphs has a type that differs from another one of the abstract graphs.

15. The method of claim 12, wherein the first node is selected to be associated when information necessary for solving the first one of the abstract graphs is missing.

16. The method of claim 12, wherein the one or more second nodes is selected according to association rules.

17. The method of claim 16, wherein said association rules are provided by an expert, wherein the expert is selected from the group comprising: intelligent software and a human expert.

18. The method of claim 12, comprising displaying on a user interface a solution to the main problem.

19. A computer-readable storage medium comprising a set of instructions that when executed by a processor in a computing apparatus cause the processor to:

construct a plurality of abstract graphs each comprising nodes, wherein each abstract graph represents one of a plurality of sub-problems, wherein the plurality of sub-problems taken together represent the main problem pertaining to an environment;

decompose at least one node of an abstract graph into at least two nodes;

associate a subset of the nodes, the associating comprising:
  (i) selecting a first node of a first one of the abstract graphs representing a first one of the sub-problems;
  (ii) selecting one or more second nodes of other abstract graphs representing a second one of the sub-problems; and
  (iii) creating an association between the first and second nodes in which information pertaining to the first node of the first abstract graph is associated to the one or more nodes of the other abstract graphs;

further decompose one or more of the other abstract graphs using the associated information and resolving least one of the other abstract graphs; and iterate the steps of associating nodes for different nodes and further decomposing to obtain a solution for the main problem.

20. A computing system, comprising:

a memory to store a plurality of sub-problems representing a main problem; and a processor operatively connected to the memory for retrieving from the memory the plurality of sub-problems, wherein the processor is to:

construct in a computing system for each of a plurality of independent sub-problems an abstract graph corresponding thereto, wherein the plurality of independent sub-problems represent a main problem, wherein each abstract graph comprises an ordered set of nodes, wherein a first node of a first abstract graph of the abstract graphs is associated with a second node of a second abstract graph of the abstract graphs;

at the first node, determine if available data can be used to solve the first abstract graph to resolve the sub-problem corresponding thereto; and if the available data cannot be used to resolve the sub-problem corresponding to the first abstract graph, switch to the second node for resolving the sub-problem corresponding to the second abstract graph.

21. The computing system of claim 20, wherein at least one of the abstract graphs has a type that differs from another one of the abstract graphs.

22. The computing system of claim 20, wherein the processor is further to apply information pertaining to a current partial solution of the abstract graphs to the environment.

23. The computing system of claim 20, further comprising a display for displaying on a user interface a solution to the main problem.

* * * * *